(12) United States Patent
Gretz et al.

(10) Patent No.: US 7,098,399 B1
(45) Date of Patent: Aug. 29, 2006

(54) THROUGH-WALL ELECTRICAL BOX

(75) Inventors: Thomas J. Gretz, Clarks Summit, PA (US); John Ofcharsky, Olyphant, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/945,405

(22) Filed: Sep. 20, 2004

(51) Int. Cl.
*H01H 9/02* (2006.01)

(52) U.S. Cl. .................. 174/58; 174/50; 174/53; 174/57; 220/3.2; 220/3.3; 248/906

(58) Field of Classification Search .................. 174/48, 174/49, 50, 53, 57, 58, 17 R; 220/3.2, 3.3, 220/3.4, 3.5, 3.6, 3.7, 3.8, 3.9, 4.02, 231.9, 220/23.19; 248/906, 343; D13/152; 439/527, 439/537, 535, 536
See application file for complete search history.

(56) References Cited

U.S. PATENT DOCUMENTS

| | | | |
|---|---|---|---|
| 1,875,101 A | | 8/1932 | Morrell |
| 1,961,728 A | * | 6/1934 | Arnest et al. .................. 174/57 |
| 2,130,839 A | * | 9/1938 | Conners ...................... 220/3.6 |
| 2,752,217 A | * | 6/1956 | Sidney ......................... 174/58 |
| 2,757,817 A | * | 8/1956 | Egan ........................... 220/3.5 |
| 2,782,954 A | * | 2/1957 | Antonucci .................. D13/152 |
| 2,875,915 A | | 3/1959 | Buckels |
| 4,063,660 A | * | 12/1977 | Ware ........................... 220/3.6 |
| 4,335,271 A | * | 6/1982 | Haslbeck ..................... 220/3.2 |
| 4,758,687 A | * | 7/1988 | Lathrop ....................... 174/53 |
| 5,833,110 A | * | 11/1998 | Chandler et al. ............ 220/3.3 |
| 5,839,594 A | | 11/1998 | Barbour |
| 6,749,162 B1 | * | 6/2004 | Nicolides et al. ......... 248/231.9 |
| 6,774,307 B1 | | 8/2004 | Kruse et al. |
| 6,812,405 B1 | * | 11/2004 | Hull et al. ..................... 174/58 |
| 6,914,187 B1 | * | 7/2005 | Hull et al. ..................... 174/50 |
| 6,955,559 B1 | * | 10/2005 | Pyrros .......................... 174/53 |

* cited by examiner

*Primary Examiner*—Angel R. Estrada

(57) ABSTRACT

A through-wall electrical box that is capable of accommodating two wall-mounted electrical devices, one for each side of a wall. One of the electrical devices faces one direction and a second electrical device faces 180 degrees away from the first device. The electrical box includes a continuous peripheral wall having an open front side, an open rear side, and a channel therein. The front side includes a front facing surface for receiving a first electrical device in the channel. The rear side includes a rear facing surface for receiving a second electrical device in the channel. The peripheral wall has a length slightly less than the width of the structural wall thereby positioning the installed electrical devices flush or slightly less than flush with the outer surfaces of the structural wall. A fastening arrangement is included on the electrical box for securing the electrical box to the structural wall.

5 Claims, 8 Drawing Sheets

THROUGH-WALL ELECTRICAL BOX

FIELD OF THE INVENTION

This invention relates to electrical junction boxes and specifically to an electrical box that can be mounted in a wall common to two rooms and can provide electrical service to each of the rooms from the one common electrical box.

BACKGROUND OF THE INVENTION

When wiring a building for electrical service, it is common to install several electrical boxes per room to provide mounting enclosures for outlets, switches, and other wall-mounted electrical devices. Commonly, the electrical boxes installed are capable of accommodating a single electrical device per box. This is adequate for providing the desired level of electrical service to the building, but is wasteful in that it requires a box for each separate electrical device. The expense of wiring a building is increased as a result of the great number of individual electrical boxes required. The large number of electrical boxes also increases the expense of wiring a building, as addition runs of wiring must be installed to provide electrical service to each of the boxes.

What is needed is an electrical box that can accommodate more than one electrical device per box, to reduce the number of electrical boxes and the overall expense of installing the electrical service.

SUMMARY OF THE INVENTION

The invention is a through-wall electrical box that is capable of accommodating two wall-mounted electrical devices, one for each side of a wall. One of the electrical devices faces one direction and a second electrical device faces 180 degrees away from the first device. The electrical box includes a continuous peripheral wall having an open front side, an open rear side, and a channel therein. The front side includes a front facing surface for receiving a first electrical device in the channel. The rear side includes a rear facing surface for receiving a second electrical device in the channel. The peripheral wall has a length slightly less than the width of the structural wall thereby positioning the installed electrical devices flush or slightly less than flush with the outer surfaces of the structural wall. A fastening arrangement is included on the electrical box for securing the electrical box to the structural wall.

OBJECTS AND ADVANTAGES

One advantage of the recessed electrical box of the present invention is that it reduces the number of electrical boxes required to provide electrical service in a building. By reducing the number of electrical boxes required, the workload for installing boxes for electrical service is cut by half, saving time and installation costs.

Reduction of the number of electrical boxes also has the advantage of reducing the amount of electrical supply wiring required to wire a room. This additionally lowers the cost of materials and reduces installation time.

These and other objects and advantages of the present invention will be better understood by reading the following description along with reference to the drawings.

TABLE OF NOMENCLATURE

Figure 1:
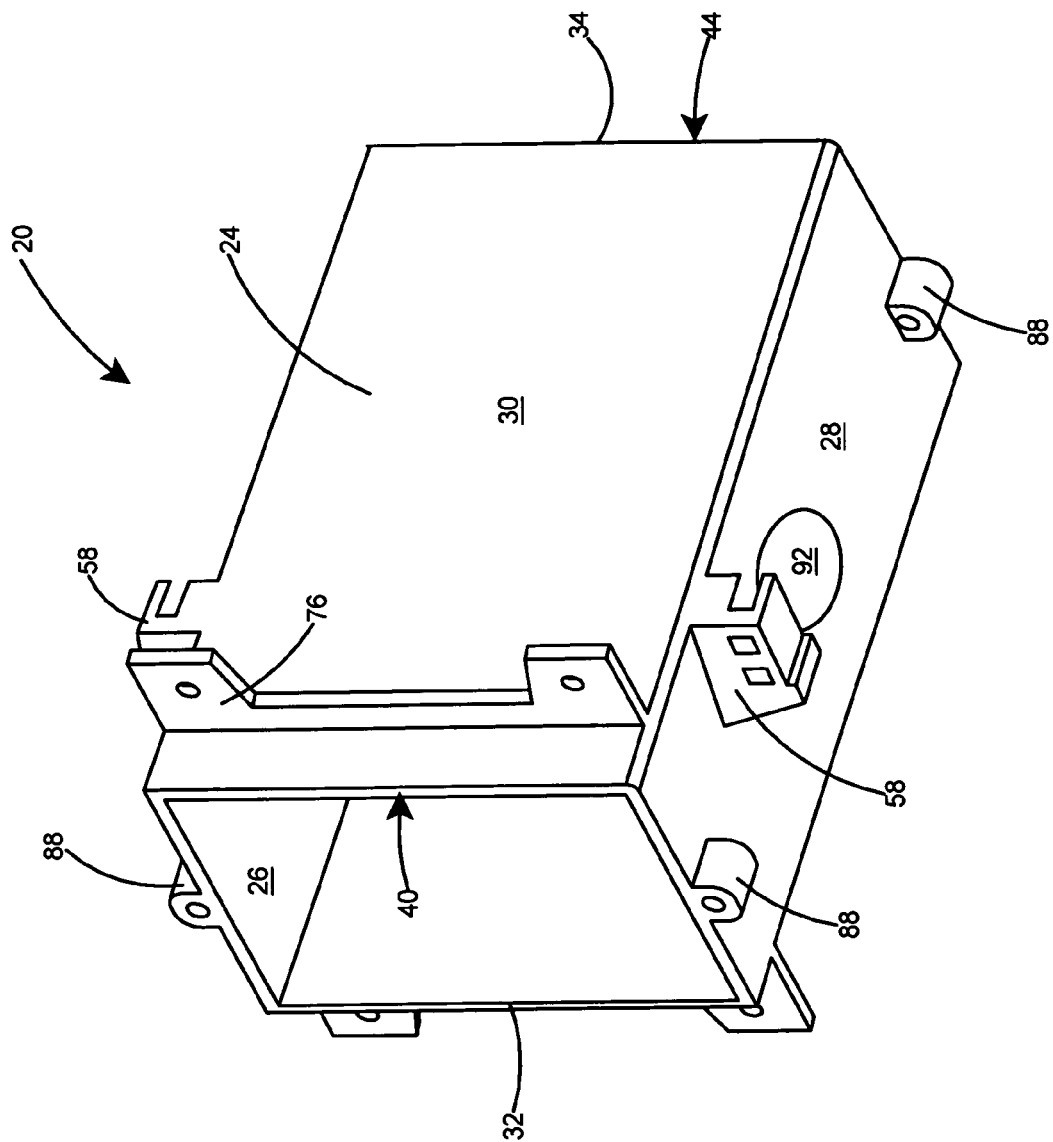
FIG. 1 is a perspective view of a first and preferred embodiment of a through-wall electrical box according to the present invention.

The following is a listing of part numbers used in the drawings along with a brief description:

| Part Number | Description |
| --- | --- |
| 20 | through-wall electrical box, preferred embodiment |
| 22 | structural wall |
| 24 | continuous peripheral wall |
| 26 | top wall |
| 28 | bottom wall |
| 30 | side wall |
| 32 | open front side |
| 34 | open rear side |
| 36 | channel |
| 38 | central axis |
| 40 | front facing surface |
| 42 | first electrical device |
| 44 | rear facing surface |
| 46 | second electrical device |
| 48 | first fastening arrangement |
| 50 | second fastening arrangement |
| 52 | top outer surface |
| 54 | bottom outer surface |
| 56 | side outer surface |
| 58 | integral projection |
| 60 | inner side of integral projection |
| 62 | outer side of integral projection |
| 64 | aperture in integral projection |
| 66 | fastener in integral projection |
| 68 | head end of fastener |
| 70 | point end of fastener |
| 72 | walls of aperture |
| 76 | flange |
| 78 | front surface of flange |
| 80 | rear surface of flange |
| 82 | aperture in flange |
| 84 | fastener |
| 86 | metal stud |
| 88 | screw receiving bosses |
| 90 | surface of boss |
| 92 | removable wall section |
| 94 | wood wall stud |
| 96 | drywall layer |
| 98 | outer surface of structural wall |
| 100 | electrical device fastener |

-continued

| Part Number | Description |
|---|---|
| 102 | wiring opening |
| 104 | faceplate |
| 106 | faceplate fastener |

DETAILED DESCRIPTION OF THE INVENTION

The present invention comprises a through-wall electrical box for securing two electrical devices on the opposite sides of a wall of a building.

Figure 11:
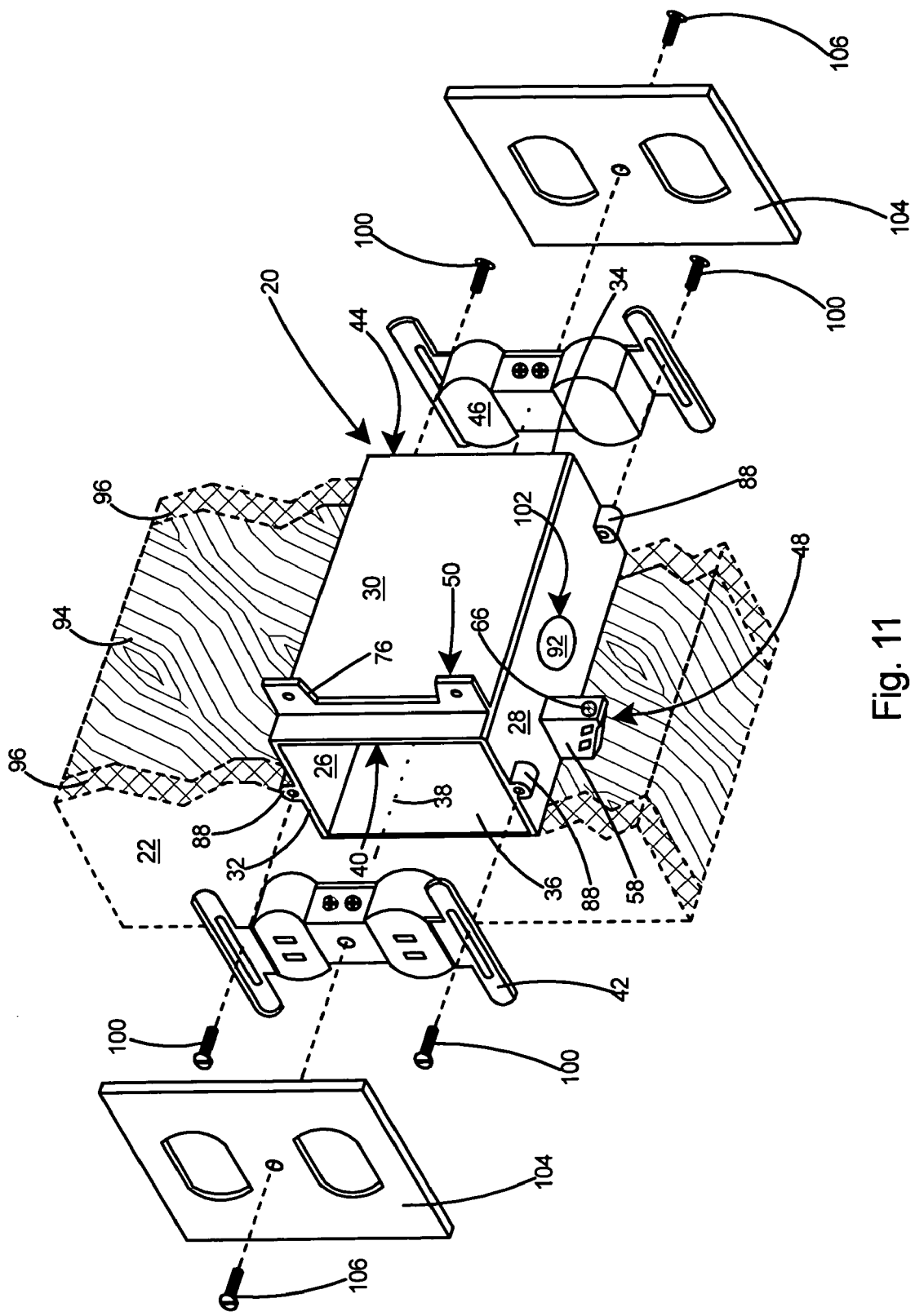
FIG. 11 is a perspective view of the through-wall electrical box secured to a structural wall and with electrical devices and faceplates in alignment for installation thereto.

With reference to FIG. 11, the through-wall electrical box 20 provides electrical service on two sides of a structural wall 22. The electrical box 20 includes a continuous peripheral wall 24 including a top wall 26, a bottom wall 28, and side walls 30. The peripheral wall 24 includes an open front side 32, an open rear side 34, and a channel 36 having a central axis 38 extending therethrough. The front side 32 includes a front facing surface 40 for receiving a first electrical device 42 in the channel 36. The rear side 34 includes a rear facing surface 44 for receiving a second electrical device 46 in the channel 36. After installation, the second electrical device 46 faces an opposite direction from the first electrical device 42. The peripheral wall 24 has a length equal to or slightly less than the width of the structural wall 22. The electrical box 20 includes a first 48 and second 50 fastening arrangement for securing the electrical box 20 to the structural wall 22.

Figure 2:
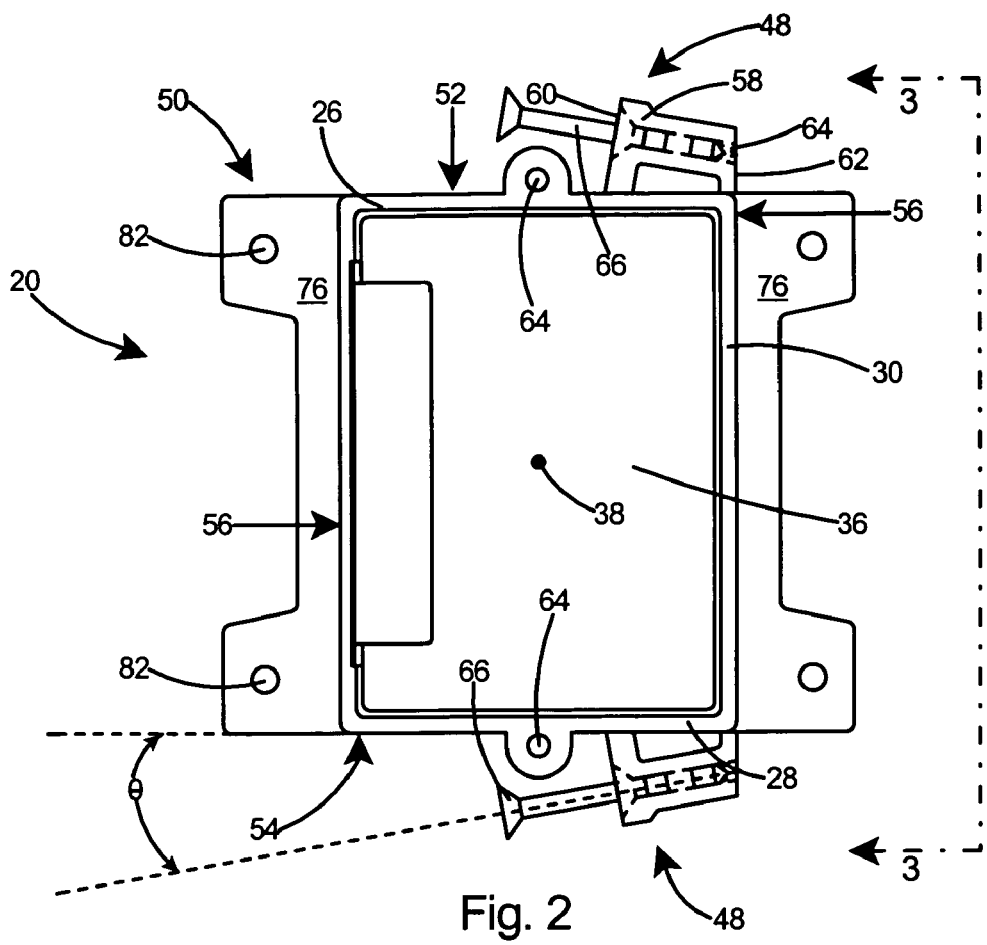
FIG. 2 is a front view of the recessed electrical box of FIG. 1.
Figure 3:
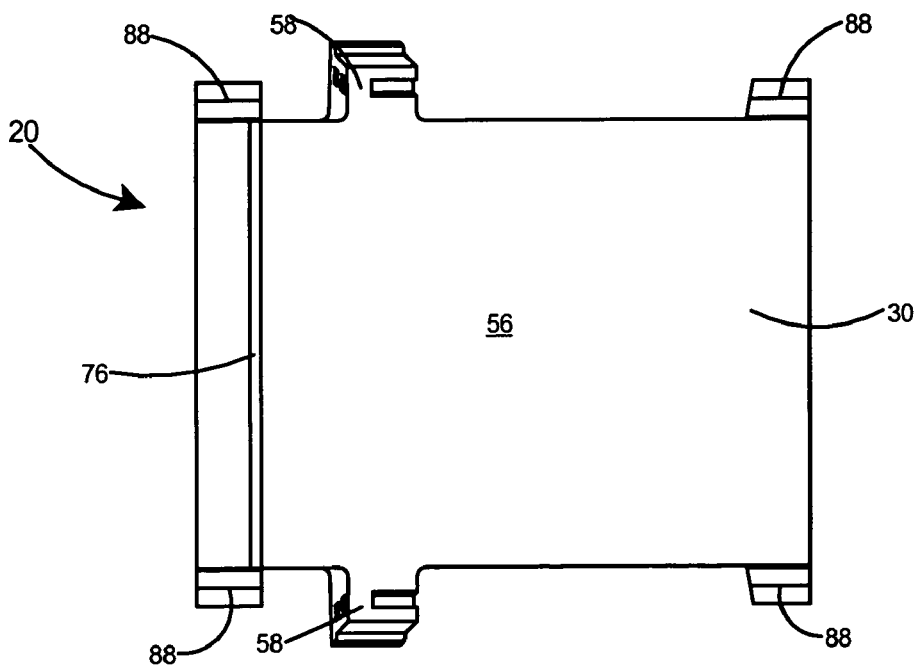
FIG. 3 is side view of the electrical box taken along line 3—3 of FIG. 2.

Referring to FIG. 2, the top 26, bottom 28, and side 30 walls each include outer surfaces including, respectively, a top outer surface 52, bottom outer surface 54, and side outer surface 56. The first fastening arrangement 48 includes integral projections 58 on the top outer surface 52 and bottom outer surface 54. The integral projections 58 include an inner 60 and an outer side 62. The outer sides 62 of the integral projections 58 are flush with the outer surface 56 of the side wall 30. An aperture 64 is oriented from the inner side 60 through the outer side 62 of the integral projections 58. To provide for ease of installation of the electrical box to an appropriate support, a fastener 66 is engaged in the aperture 64 of each integral projection 58.

Figure 7:
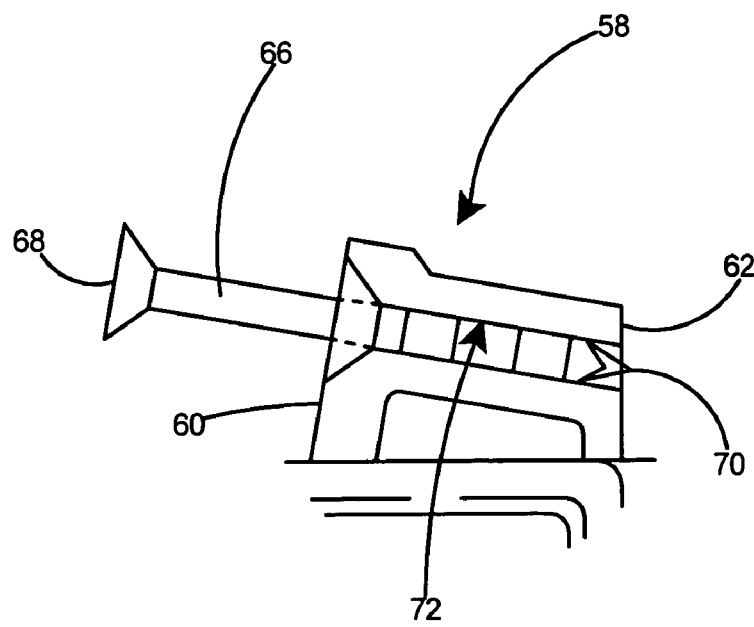
FIG. 7 is a detailed view of a first fastening arrangement portion of the electrical box of FIG. 1.

With reference to FIG. 7 depicting a detailed view of an integral projection 58, the fastener is a nail 66 that includes a head end 68 and a point end 70. The head end 68 extends from the inner side 60 of the integral projection 58 and the point end 70 is approximately flush with the outer side 62 of the integral projection 58. The point end 70 of the nail 66 is held frictionally within the aperture 64 by the 72 walls of the aperture. The fastener 66 may also be a screw (not shown).

By reference to the front view of the electrical box 20 in FIG. 2, it is shown the fastener 66 is at an angle approximately normal to the central axis 38 of the channel 36. Preferably the fastener 66 is at an angle of between 5 and 15 degrees with respect to the top 52 and bottom 54 outer surfaces.

Figure 4:
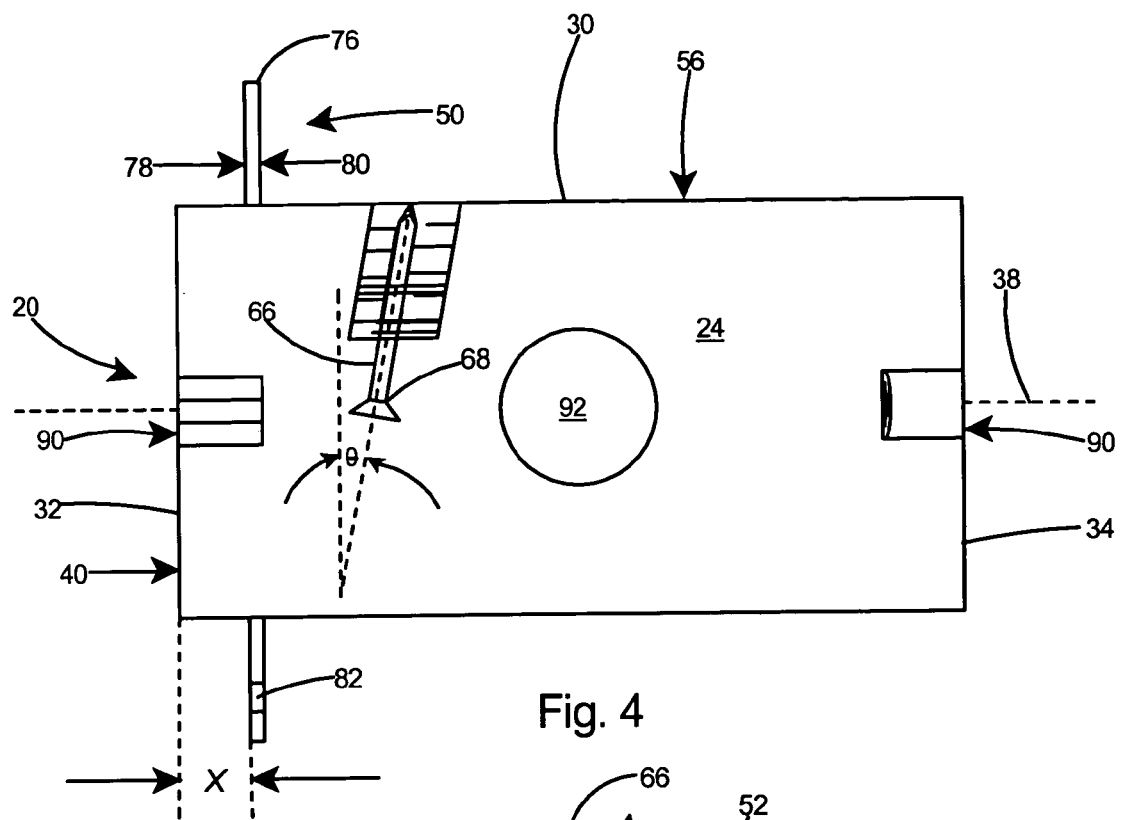
FIG. 4 is a top view of the electrical box of FIG. 2.

Referring to the side view of the electrical box 20 in FIG. 4, the fastener 66 is also preferably at an angle θ of between 5 and 15 degrees with respect to the front facing surface 40 of the peripheral wall 24.

Figure 8:
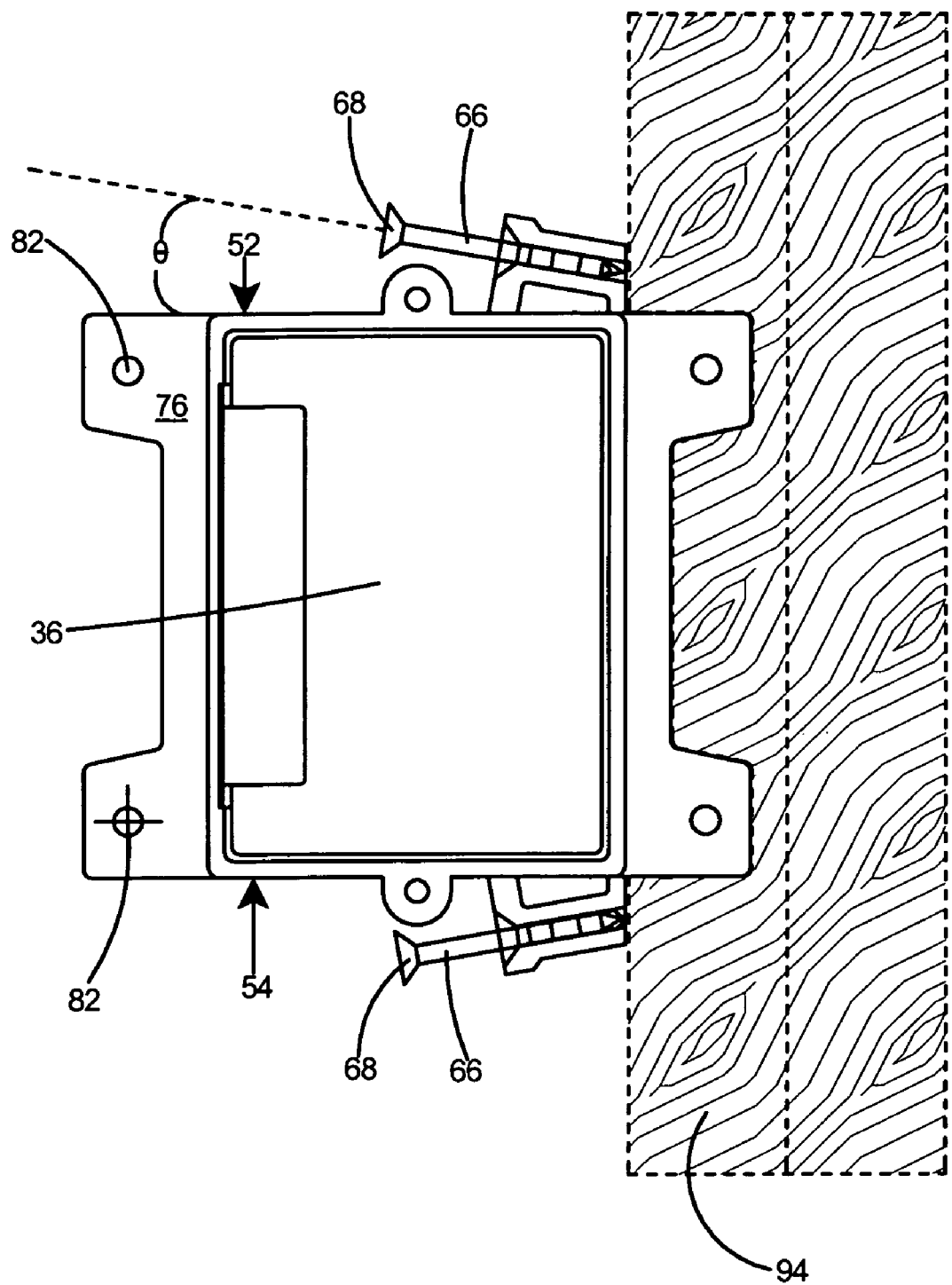
FIG. 8 is a front view of the electrical box of FIG. 1 installed on a wooden wall stud of a building.

By angling the fastener 66 away from the top 52 and bottom 54 outer surfaces of the electrical box 20 as shown in FIG. 8, the head end 68 of the fastener 66 is conveniently angled away from the top outer surface 52 and bottom outer surface 54 thereby making it easier for an installer to strike it or access it with a tool such as a hammer or screwdriver (not shown), whichever is appropriate for the type of fastener used.

Additionally, by angling the fastener 66 toward the front facing surface 40 of the peripheral wall 24, as shown in FIG. 4, the head end 68 of the fastener 66 is conveniently angled toward the front facing surface 40 of the electrical box 20 thereby making it easier for an installer access it from the front side 32 of the box 20, where he would typically be situated.

Figure 5:
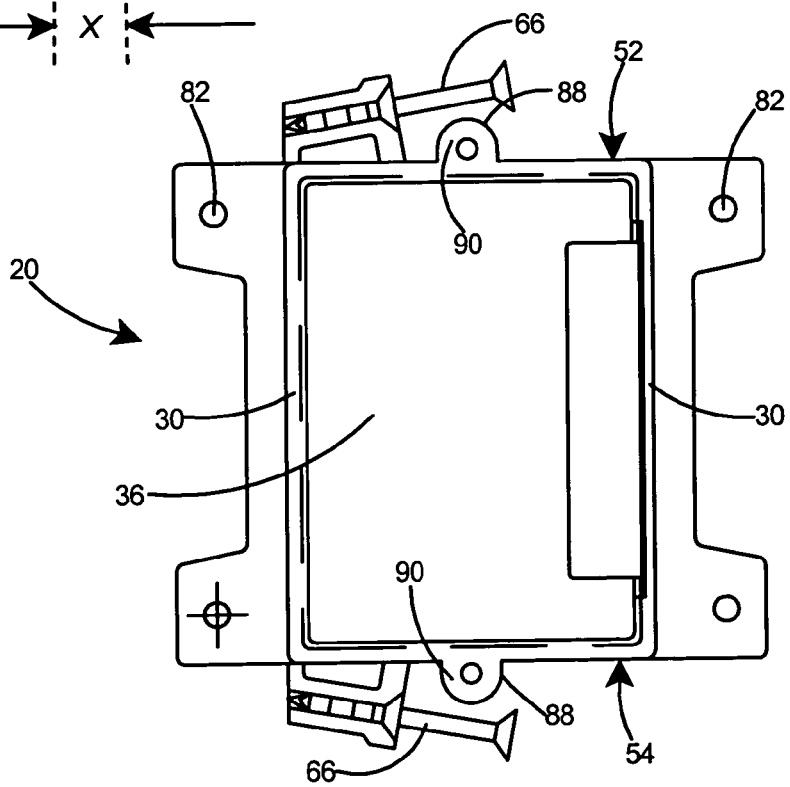
FIG. 5 is a back view of the electrical box of FIG. 2.
Figure 6:
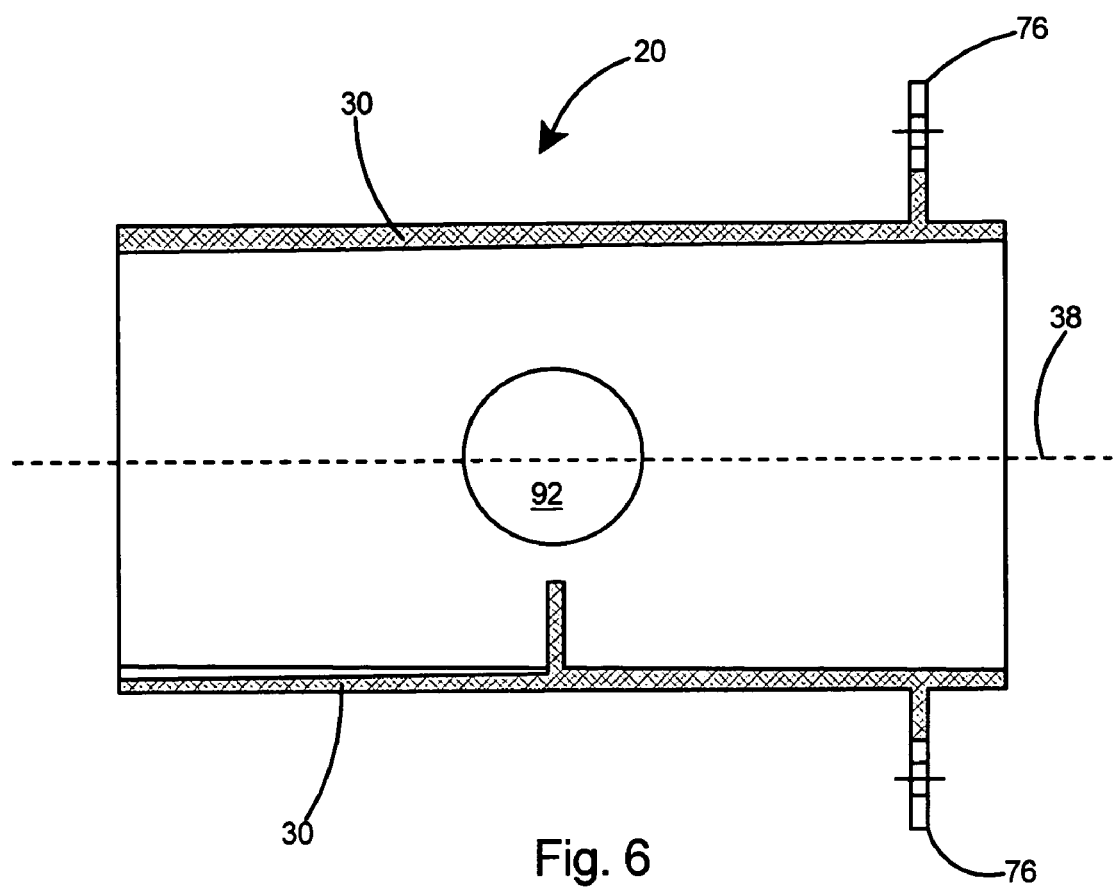
FIG. 6 is a sectional view of the electrical box taken along line 6—6 of FIG. 5.
Figure 9:
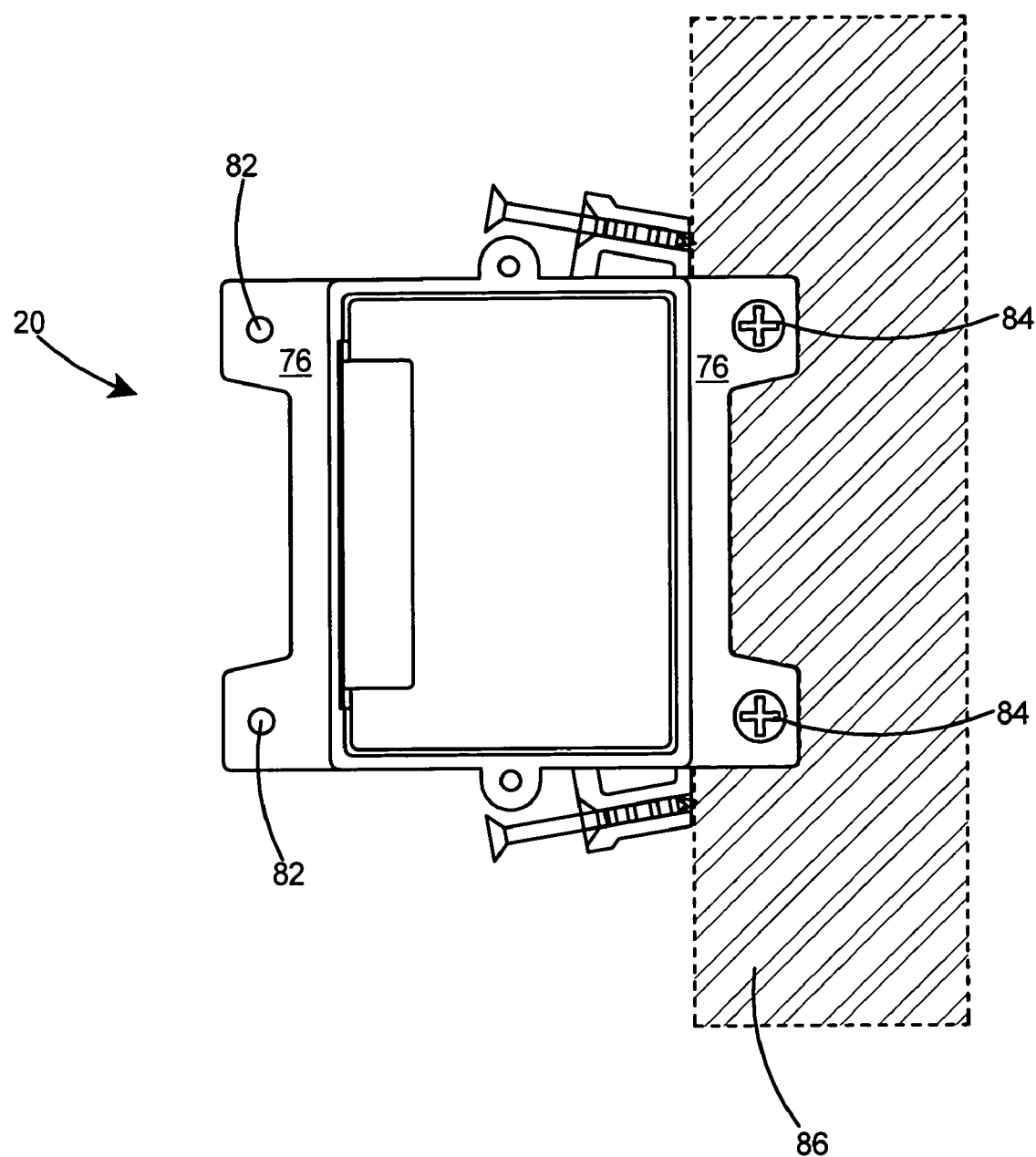
FIG. 9 is a front view of the electrical box of FIG. 1 installed on a metal stud of a building.

With reference to FIGS. 4 and 5, the preferred embodiment of the electrical box 20 of the present invention also includes a second fastening arrangement 50 that includes an integral flange 76 extending laterally from the outer surface 56 of one or more of the side walls 30. The flange 76 includes a front 78 and rear 80 surface with the front surface 78 of the flange 76 located a first distance X from the front facing surface 40 of the peripheral wall 24. The flange 76 includes one or more apertures 82 bored axially there through from the front surface 78 to the rear surface 80 of the flange 76. The apertures 82 in the flange 76 are in axial alignment with the central axis 38 of the channel 36. As shown in FIG. 9, fasteners 84 are driven through the apertures 82 in the flange 76 to secure the electrical box 20 to a metal stud 86.

With reference to FIGS. 4 and 5, the through-wall electrical box 20 includes screw receiving bosses 88 integral with and extending from the top 52 and bottom 54 outer surfaces at the front 32 and rear sides 34 of the peripheral wall 24. The bosses 88 are centered between the side walls 30. The bosses 88 adjacent the front facing surface 40 of the electrical box 20 include an outer surface 90 planar with the front facing surface 40 of the electrical box 20. The bosses 88 adjacent the rear facing surface 44 of the electrical box 20 include an outer surface 90 planar with the rear facing surface 44 of the electrical box 20.

As shown in FIG. 4, the through-wall electrical box 20 includes one or more removable wall sections 92 or knockouts in the top 26 and bottom 28 walls of the electrical box. The removable wall sections can be removed for the purposes of running an electrical supply cable (not shown) into the electrical box.

Figure 10:
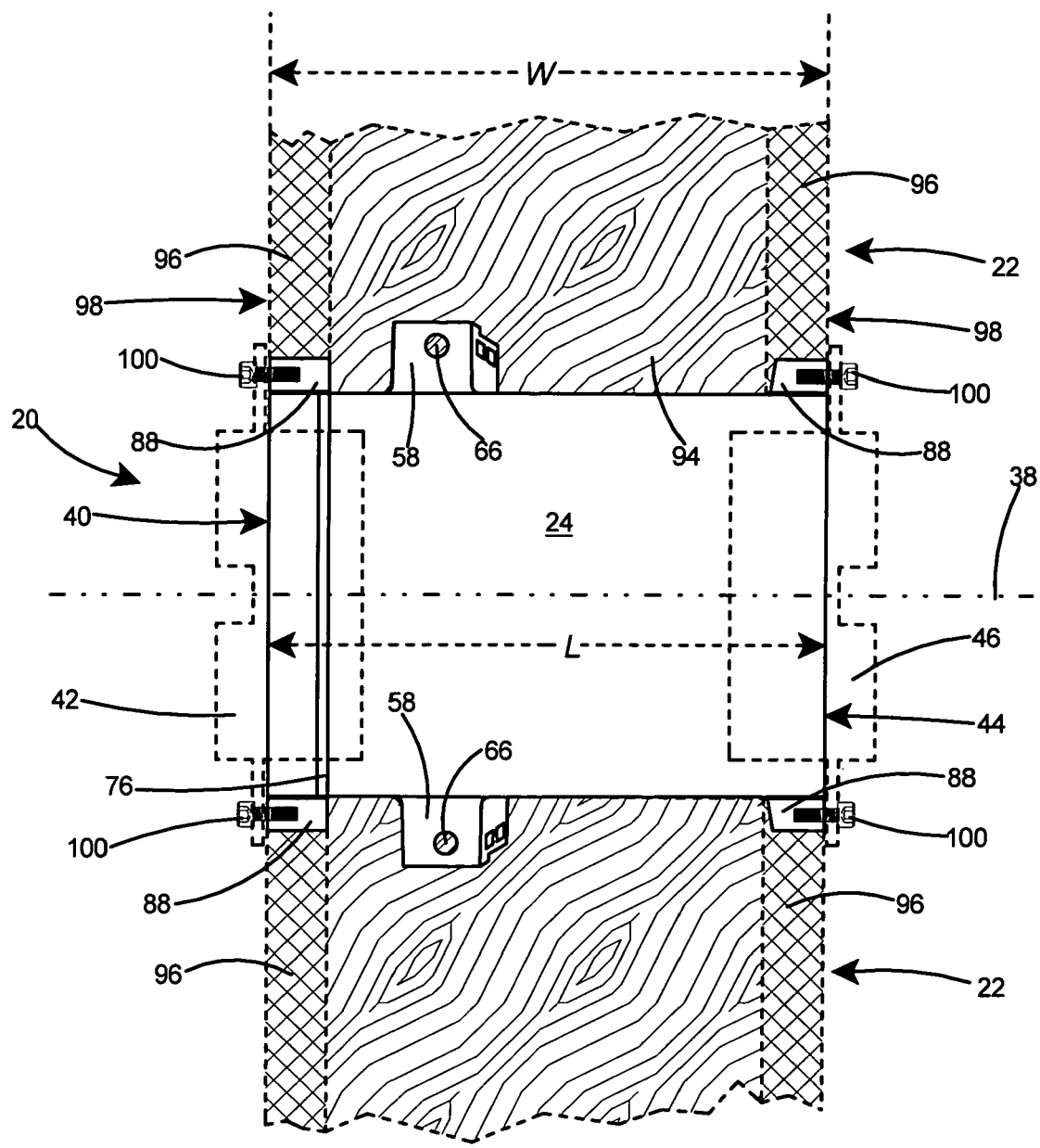
FIG. 10 is a side view of the electrical box of FIG. 1 with two installed electrical devices secured to a structural wall.

FIG. 10 depicts the through-wall electrical box 20 secured to a wooden wall stud 94 that forms a portion of the structural wall 22 of a building. The structural wall 22 includes two drywall layers 96 secured to the wall stud 94. The length L of the peripheral wall 24 is between 0 and 0.5 inch less than the width W of the structural wall 22. It is critical that the length L of the peripheral wall 24 be set at a length equal to or slightly less than the width W of the structural wall 22 so that, upon securement of the electrical box 20 to the wall stud 94, the front 40 and rear 44 facing surfaces of the electrical box 20 will be positioned either flush with or within 0.25 inch of the outer surfaces 98 of the structural wall 22. If the length L of the peripheral wall 24 is not within 0.5 inch of the width W of the structural wall 22, then the electrical device fasteners 100 will not extend the desired depth into the screw receiving bosses 88 on the electrical box 20. A typical structural wall is composed of a wall stud 94 that is 3.5 inches wide and two drywall layers 96 that are each ½ inch thick. A typical structural wall then would measure 4.5 inches (W) thick total. The through-wall electrical box 20 of the present invention therefore preferably has a length L of between 4.0 and 4.5 inches. Most preferably, the length L of the through-wall electrical box 20 is 4.26 inches.

As shown in FIG. 10, once the electrical devices 42, 46 are secured to the electrical box 20, the second electrical device 46 faces 180 degrees away from the first electrical device 42 and both electrical devices 42, 46 are centered on the central axis 38. The electrical devices 42, 46 installed on the electrical box 20 are positioned flush or slightly less than flush with the outer surfaces 98 of the structural wall 22. The front 40 and rear 44 facing surfaces are planar and normal to the peripheral wall 24.

Preferably, the electrical box 20 is molded of plastic in one-piece. The preferred method of producing the electrical box is by injection molding of plastic. Although many plastic materials would be acceptable for injection molding of the electrical box 20, an especially preferred plastic is polycarbonate.

The reader is referred to FIG. 11 for the operation of the through-wall electrical box 20. The through-wall electrical box is used to install two electrical devices on opposite sides of a structural wall. As shown in FIG. 11, the electrical box 20 is first secured to the structural wall 22 by use of one of the fastening arrangements 48, 50. For the structural wall 22 including a wood wall stud 94, such as shown in FIG. 11, fasteners 66 held frictionally in the apertures 64 in the integral projections 58 are driven into the wood stud 94 to secure the electrical box 20 to the structural wall 22. One or more of the removable wall sections 92 are then removed to create a wiring opening 102 therein. Electrical supply wiring including wiring leads (not shown) are then pulled through the wiring opening 102. The wiring leads are then secured to the electrical devices 42, 46. The first electrical device 42 is secured to the front facing surface 40 by driving the electrical device fasteners 100 into the bosses 88 at the front of the electrical box 20 and the second electrical device 46 is secured to the rear facing surface 44 by driving the electrical device fasteners 100 into the bosses 88 at the rear of the electrical box 20. To complete the installation, faceplates 104 are secured with fasteners 106 to the electrical devices 42, 46.

Having thus described the invention with reference to a preferred embodiment, it is to be understood that the invention is not so limited by the description herein but is defined as follows by the appended claims.

What is claimed is:

1. An electrical box for providing electrical service on two sides of a structural wall comprising:
   an integral one-piece continuous peripheral wall including a top wall, a bottom wall, and rigid side walls;
   said top, bottom, and side walls each include outer surfaces;
   said peripheral wall having an open front side, an open rear side, and a channel having a central axis extending therethrough;
   said front side including a front facing surface for receiving a first electrical device in said channel;
   said rear side including a rear facing surface for receiving a second electrical device in said channel;
   said electrical devices centered on said central axis of said channel;
   said second electrical device facing an opposite direction from said first electrical device;
   said peripheral wall having a length slightly less than the width of said structural wall;
   screw receiving bosses integral with and extending from said outer surfaces of said top wall and said bottom wall at said front and rear sides of said peripheral wall;
   a fastening arrangement on each of said rigid side walls of said electrical box for securing said electrical box to said structural wall;
   said fastening arrangement including an integral flange extending laterally along the entire length of said side wall;
   one aperture proximate each end of said flange; and
   a fastener for engaging through said aperture in said flange.

2. The electrical box of claim 1 wherein said front and rear facing surfaces are planar and normal to said peripheral wall.

3. The electrical box of claim 1 having a second fastening arrangement including
   an integral projection on said top outer surface having an aperture and said bottom outer surface;
   a mounting fastener frictionally engaged and held therein in said aperture;
   said mounting fastener is at an angle of between 5 and 15 degrees with respect to said front facing surface of said peripheral wall; and
   said mounting fastener is at an angle of between 5 and 15 degrees with respect to said top outer surface and said bottom outer surface.

4. The electrical box of claim 1 including
   said bosses centered between said side walls;
   said bosses on said front side including an outer surface planar with said front facing surface of said electrical box; and
   said bosses on said rear side including an outer surface planar with said rear facing surface of said electrical box.

5. The electrical box of claim 1 wherein said electrical box is molded of plastic in one-piece.

* * * * *